United States Patent [19]

Krogsrud

[11] 4,238,634
[45] Dec. 9, 1980

[54] GAS TIGHT SEAL FOR ELECTRODES IN SMELTING FURNACES

[75] Inventor: Harald Krogsrud, Gjettum, Norway
[73] Assignee: Elkem-Spigerverket A/S, Oslo, Norway
[21] Appl. No.: 5,381
[22] Filed: Jan. 22, 1979

Related U.S. Application Data

[63] Continuation-in-part of Ser. No. 966,269, Dec. 4, 1978, abandoned.

[30] Foreign Application Priority Data

Dec. 5, 1977 [NO] Norway .................................. 774138

[51] Int. Cl.³ ............................................. H05B 7/12
[52] U.S. Cl. ...................................................... 13/17
[58] Field of Search ................................. 13/31, 14–17

[56] References Cited

U.S. PATENT DOCUMENTS

| | | | |
|---|---|---|---|
| 2,778,865 | 1/1957 | Kongsgaarden | 13/16 |
| 2,884,475 | 4/1959 | Foyn | 13/16 |
| 2,921,108 | 1/1960 | Meffert | 13/16 |

Primary Examiner—Roy N. Envall, Jr.
Attorney, Agent, or Firm—Eyre, Mann, Lucas & Just

[57] ABSTRACT

An apparatus providing a gas tight seal for electrodes in covered electrical smelting furnaces is disclosed. The apparatus is characterized by hydraulic hoses which permit movement of the electrodes and their associated holders without loss of a gas tight seal.

5 Claims, 1 Drawing Figure

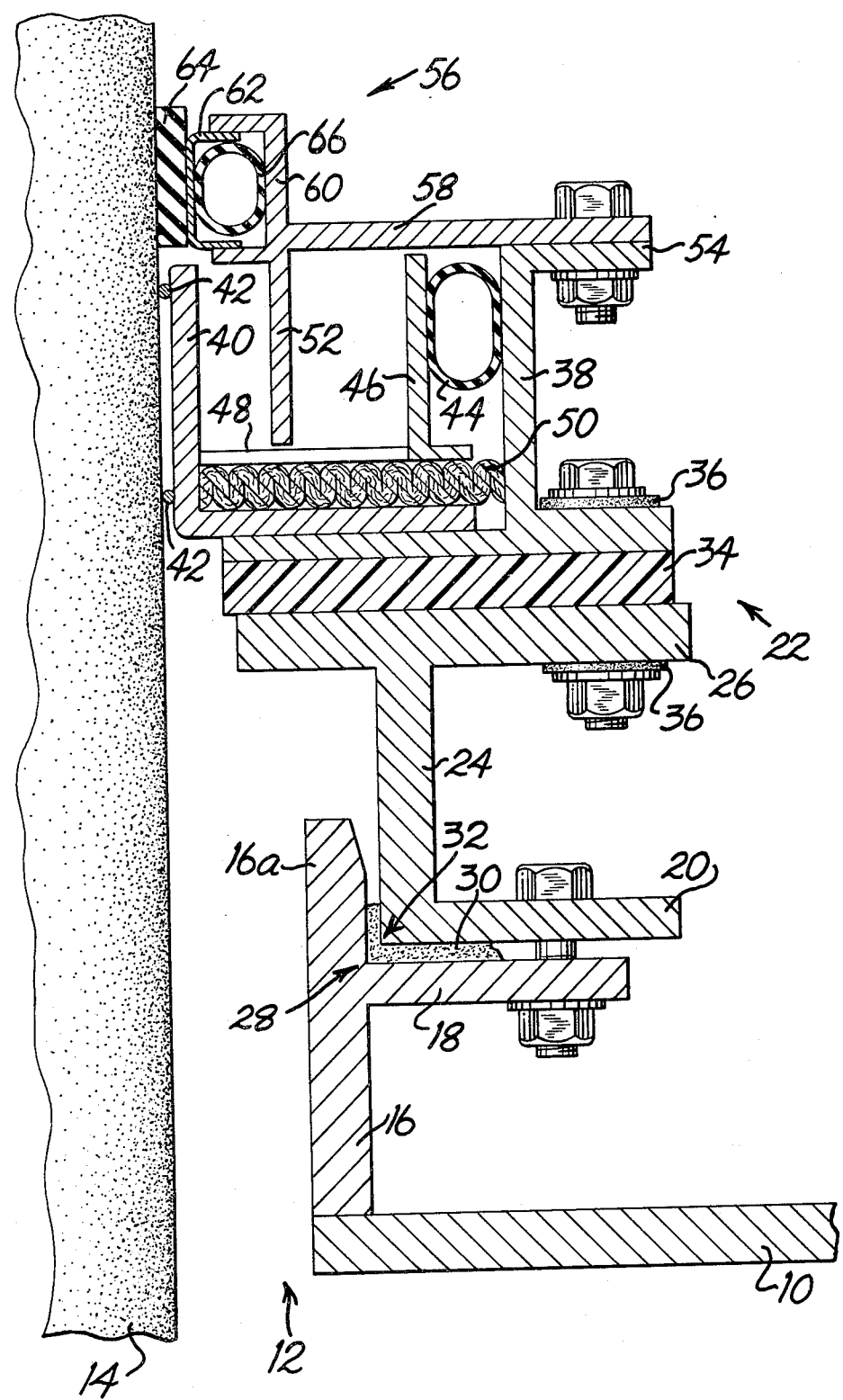

GAS TIGHT SEAL FOR ELECTRODES IN SMELTING FURNACES

This application is a continuation-in-part of U.S. application Ser. No. 966,269, filed Dec. 4, 1978, now abandoned.

The present invention relates to covered electrical smelting furnaces such as those used in the production of ferro alloys, pig iron, carbides and the like. In particular, the present invention relates to a gas tight sealing arrangement for the electrodes whereby they can be moved horizontally and vertically without loss of the gas seal.

It is well known in the industry that gases continually escape from smelting furnaces, and various attempts have been made to reduce the escaping gases, especially for environmental reasons. One of the areas from which gases escape is the apertures in the cover through which the electrodes in their electrode holders are inserted. Because the electrodes must be free to move slightly with the charge and because the electrode holders must be capable of moving up and down, there must necessarily be some freedom of movement of the electrode with respect to the aperture and there must necessarily be some gap between the aperture and the electrode holder to permit this. This gap is usually filled with a so-called asbestos braid which surrounds and bears against the electrode holder, thus sealing the gap between the aperture and the electrode holder to a considerable degree. While this proved quite satisfactory for a number of years, environmental restrictions have become such that it is difficult to meet them with a sealing arrangement using asbestos braid. Still further problems arise with asbestos braid because of its known health hazard. As the electrode holder moves up and down and abrades against it, some asbestos will necessarily be released into the air, contrary to the best working conditions for the furnace operators.

The applicant has now discovered an arrangement whereby a virtually completely gas tight seal can be achieved in the gap between the cover in the electric smelting furnace and the electrode holder carrying the electrode. This is achieved with an arrangement which permits both vertical and sideways movement of the electrode while still providing a gas tight seal. The arrangement is characterized by hydraulic hoses which both damp the movement of the electrode and provide continuous pressure applied against the electrode holder to continuously effect a gas tight seal.

These and other aspects of the present invention may be more fully understood with respect to the FIGURE which shows a cross-sectional view of a sealing arrangement according to the present invention.

In the FIGURE there is shown the roof 10 of an electric smelting furnace (not shown). Affixed to the roof 10 adjacent the aperture 12 for the electrode (not shown) and electrode holder 14 is a flange 16. Projecting from the flange 16 is a leg 18 for affixation of the leg 20 of the sealing apparatus shown generally by 22. The horizontal leg 20 is affixed to a vertical leg 24 which in turn is affixed to the base 26 of the sealing apparatus 22. Leg 16 preferably has an extension 16a above the leg 18 so that a corner 28 is formed which can be filled with sealing material 30 to provide a gas tight seal between corner 28 and the corner 32 formed by legs 20 and 24 of the sealing apparatus 22. The main portion of the sealing apparatus 22 is electrically isolated from the base 26 and thus from the smelting furnace roof or cover 10 by an electrically insulating layer 34 together with electrically insulating washers 26. On top of the electrically insulating layer 34 is an annular housing 38 for carrying sealing elements 40. Sealing elements 40 have beads 42 welded on the surface thereof, with the beads bearing against the electrode holder 14. After the beads 42 are welded to the sealing elements 40, they are machined to correspond as near as possible to the outer diameter of the electrode holder 14. It will be appreciated that the beads are employed since they are considerably easier to machine than would be the entire face of the sealing elements 40. There will, of course, be a number of arcuate sealing elements 40 disposed about the circumference of the electrode holder 14. This plurality of elements 40 is made gas tight with respect to the housing 38 by means of a pneumatic hose 44. The pneumatic hose bears against a leg 46 which is affixed to base 48 which is thermally insulated from the sealing elements 40 by a layer of mineral wool 50. Leg 46 in combination with leg 52 prevents substantial vertical or angular movement of the sealing elements 40 while permitting horizontal movement. On the top of housing 38 and affixed to flange 54 thereof is an upper sealing member shown generally at 56. This comprises base member 58 which carries leg 52 as well as U-shaped housing 60. The U-shaped housing 60 has slidably fitted therein an opposed U-shaped member 62 to which is affixed a sealing material 64 which is of a resilient material. Between U-shaped housing 60 and U-shaped member 62 is a pneumatic hose 66 which urges resilient member 64 against the electrode holder 14.

The pneumatic hoses 44 and 66 compensate for sideways movement of the electrode (not shown) and electrode holder 14. If, for example, the electrode (holder) 14 moves to the right, this will cause compression of the pneumatic hoses 44 and 66. Reduction of the pneumatic hoses at this point will, of course, cause an increase in pressure on the opposed side (not shown) of the electrode which in turn will cause the sealing elements 40 and the resilient material 64 on said opposed side to be brought forward to continue to bear against the electrode. Since constant pressure will be maintained in the interior of the pneumatic hoses 44 and 66, there will not be uneven pressure applied to the electrodes electrode holder around the circumference thereof. Furthermore, since forces applied against the pneumatic hoses 44 and 66 in one area of the electrode holder will automatically be transmitted to other areas of the pneumatic hose throughout the circumference of the electrode holder, it is not necessary to have the sealing elements 40 and the resilient member 64 bear against the electrode holder 14 with more than minimal force, suitably on the order of 0.5-5 atmospheres. This is in contrast to simply having resilient elements such as springs in place of the pneumatic hoses. Springs or other similar resilient elements will operate independently and thus a considerably greater pressure must be applied to compensate for whether the spring is in the compacted or extended condition. This exerts an undesirably heavy force on portions of the electrode holder and will lead to relatively quick wearing away of the sealing elements 40 and resilient member 64 because of the relatively frequent up and down movement of the electrode holder 14 which bears against these members.

It will be understood that the claims are intended to cover all changes and modifications of the preferred embodiments of the invention, herein chosen for the purpose of illustration, which do not constitute departures from the spirit and scope of the invention.

What is claimed is:

1. In an electrical smelting furnace having a cover and having at least one electrode carried in an electrode holder which extends through an aperture in said cover, a gas sealing arrangement for sealing the gap between the cover and the holder carrying the electrode, said gas sealing arrangement comprising:
   (a) an annular housing affixed to said cover adjacent said aperture;
   (b) a plurality of sealing members in said housing adjacent said electrode holder;
   (c) a pneumatic hose positioned between said housing and said plurality of sealing members, said pneumatic hose urging said sealing members against said electrode holder.

2. The electrical smelting furnace of claim 1 wherein said gas sealing arrangement further comprises a second gas sealing means mounted on said housing, said second gas sealing means comprising a U-shaped housing inside of which an opposed U-shaped member slidingly fits and with a resilient member affixed to the face of said opposed U-shaped member and in which a second pneumatic hose is disposed between the U-shaped housing and the U-shaped member, said pneumatic hose urging said resilient member against said electrode holder.

3. The electrical smelting furnace of claim 1 wherein the housing of said gas sealing arrangement is electrically isolated from the cover of the smelting furnace.

4. The electrical smelting furnace of claim 1 wherein each of said gas sealing elements is an "L" shaped member comprising a vertical leg and a horizontal leg, with the vertical leg bearing against the electrode holder.

5. The electrical smelting furnace of claim 4 wherein there is at least one bead on the surface of said vertical leg which bears against the electrode holder.

* * * * *